United States Patent [19]

Heyes et al.

[11] Patent Number: 5,149,389
[45] Date of Patent: Sep. 22, 1992

[54] LAMINATED METAL SHEET

[75] Inventors: Peter J. Heyes, Oxfordshire; Nicholas J. Middleton, Wiltshire; Alison M. Brown, Oxfordshire, all of England

[73] Assignee: CMB Foodcan plc, Woodside, England

[21] Appl. No.: 512,544

[22] Filed: Apr. 18, 1990

Related U.S. Application Data

[63] Continuation-in-part of Ser. No. 377,837, Jun. 9, 1989, abandoned.

[30] Foreign Application Priority Data

Oct. 15, 1987 [GB] United Kingdom ............... 8724239

[51] Int. Cl.⁵ ............................................. B32B 31/26
[52] U.S. Cl. ............................. 156/272.4; 156/309.9; 156/322; 156/324.4
[58] Field of Search ............... 428/623, 626, 659, 457, 428/458, 483; 220/454, 456, 457; 156/272.4, 309.9, 322, 324.4

[56] References Cited

U.S. PATENT DOCUMENTS

| | | | |
|---|---|---|---|
| 3,647,592 | 3/1972 | Woodberry | 156/272.2 |
| 4,143,790 | 3/1979 | Ueno et al. | 428/458 |
| 4,319,610 | 3/1982 | Eckner | 156/322 |
| 4,322,003 | 3/1982 | Long | 428/458 |
| 4,330,587 | 5/1982 | Woodbrey | 428/458 |
| 4,362,775 | 12/1982 | Yabe et al. | 428/458 |
| 4,614,691 | 9/1986 | Inui et al. | 428/623 |
| 4,735,835 | 4/1988 | Taira et al. | 220/456 |
| 4,849,293 | 7/1989 | Koga et al. | 428/447 |
| 4,935,079 | 6/1990 | Nelson-Ashley et al. | 156/309.9 |
| 5,059,460 | 10/1991 | Heyes et al. | 156/309.9 |

FOREIGN PATENT DOCUMENTS

| | | | |
|---|---|---|---|
| 58-82717 | 5/1983 | Japan | 156/272.2 |
| 61-149340 | 7/1986 | Japan | |
| 88/7620 | 6/1989 | South Africa | |

Primary Examiner—George Wyszomierski
Attorney, Agent, or Firm—Burns, Doane, Swecker & Mathis

[57] ABSTRACT

A laminated metal sheet, the metal sheet having adhered on at least one major surface thereof a film of a non-crystalline polyester, and a process for the preparation thereof. The laminated metal sheet is particularly useful for forming into drawn and wall ironed (DWI) cans. The laminate is also useful for forming other non-retorted packaging components.

35 Claims, 2 Drawing Sheets

LAMINATED METAL SHEET

This application is a continuation-in-part of U.S. patent application Ser. No. 377,837, filed Jun. 9, 1989, abandoned.

The present invention relates to laminated metal sheet and to a process for producing such laminated metal sheet.

Lamination of polymer materials to metal sheet such as metal strip is a well known and well documented technique. The resultant laminates have many applications including use for the manufacture of drawn and wall-ironed cans, (also referred to as DWI cans).

It is known to use steel or aluminium coated with polyolefin coatings as a stock for PreParing DWI cans. Such materials are described, for example, in U.S. Pat. No. 4096815 and British Patent 2003415; as far as we are aware, such materials have not found commercial application.

We have found that polyolefin coatings do not form as well as thermoplastic polyesters. The lamination of polyester coatings to steel and aluminium is described, for example, in British Patents 2123746 and 2164899. However, these patents emphasize that retention of some biaxial orientation in the polyester coating is necessary for adequate container shelf life. We have found that laminates of the types described in these patents are not capable of being subjected to the forming operations which are required to prepare deep drawn or DWI cans without severe disruption of the polyester coatings occurring. The retained orientation in the coatings described in British Patents 2123746 or 2164899 limits the elongation at break value of the coatings to relatively low values which are exceeded in DWI can forming operations. Such laminates are therefore unsuitable for forming deep drawn or DWI cans.

We have now found that a laminate of a metal sheet having adhered thereto a thermoplastic polyester which is in substantially non-crystalline (or amorphous) form survives DWI operations and retains acceptable metal coverage. Such coatings out-perform polyolefin coatings in DWI can forming, and retain better continuity and protection.

Accordingly, in one aspect, the present invention provides a laminated metal sheet, the metal sheet having adhered on at least one major surface thereof a film of a non-crystalline polyester.

The non-crystalline polyester is most preferably a non-crystalline copolyester consisting essentially of a copolymer having at least about 60 mole percent preferably 75 mole percent, and most preferably 80 mole percent, polyethylene terephthalate. The remainder is less than about 40 mole percent preferably 25 mole percent, and most preferably 20 mole percent of modifying agents Specifically, the remainder may be copolymerized ester units other than ethylene terephthalate, particularly isophthalate, in an amount less than about 40 mole percent preferably 25 mole percent, and most preferably 20 mole percent. The film may be a composite having an outer layer of coextruded polyethylene terephthalate homopolymer. A different coextruded composite film may be adhered to each side of the metal sheet, with the outer layer of at least one of them being such a homopolymer.

The non-crystalline polyester (also referred to herein as an amorphous polyester) should be substantially free from orientation and crystallinity as determined by x-ray diffraction or density measurements.

A method for measuring crystallinity by x-ray diffraction is given in GB 1566422. Crystallinity can be measured from density measurements as follows:

$V_c$ = Volume fraction crystallinity
$V_c = (P - P_a) \cdot (P - P_c)^{-1}$
$P$ = density of Polyester
$P_a$ = density of amorphous polyester
$P_c$ = density of crystalline polyester The density measurements can be made in zinc chloride/water solution or n-heptane/carbon tetrachloride using a density column.

Typically the non-crystalline polyester is a polyethylene terephthalate (PET). The polyester materials employed in accordance with the present invention preferably have an intrinsic viscosity between 0.5 and 1.1, and more preferably between 0.5 and 0.9, as measured by gel permeation chromatography. The terms "polyethylene terephthalate" and "PET" as used herein are meant to include PET no matter how prepared. Furthermore, these terms are meant to include polyethylene terephthalate polymers which are reacted with minor, i.e., less than about 40 percent, preferably less than about 25 percent, and most preferably less than about 20 percent, by weight of the polymer, amounts of copolymerizable ester units other than PET and other modifying agents. Such modifying agents include various diols such as diethylene glycol, trimethylene glycol 1,4 butane diol, cyclohexane dimethanol and 1,3 propane diol. Other modifying agents include various diacids such as hexahydroterephthalic acid, bibenzoic acid, sebacic acid, azelaic acid, isophthalic acid, adipic acid, 2,6 naphthalene dicarboxylic acid and p-hydroxy benzoic acid. Minor amounts of conventional chain branching agents and/or chain terminating agents may also be used.

The PET useful in the present invention will typically be a condensation polymer but may be prepared by any means known to those having ordinary skill in this art. For example, the PET may be prepared by the esterification of a dihydric alcohol component such as ethylene glycol and a difunctional acid component such as terephthalic acid or by the ester interchange of dialkyl esters of terephthalic acid such as dimethyl terephthalate with ethylene glycol.

PET produced by homopolymerization reactions, such as by the well-known homopolymerization by alcoholysis of bis(hydroxyethyl) terephthalate, is also useful in the present invention. Other examples of PET production methods are described by M. P. Stevens in "Polymer Chemistry" (1975), the content of which is incorporated by reference.)

In one embodiment of the invention, the non-crystalline polyester film directly adhered to one or both surfaces of a metal sheet is formed from a difunctional acid component comprising at least 60 mole percent (preferably 75 mole percent, and most preferably 80 mole percent) terephthalic acid and a dihydric alcohol component comprising at least 60 mole percent (preferably 75 mole percent, and most preferably 80 mole percent) ethylene glycol.

The non-crystalline polyester film laminated to the metal sheet is obtained by laminating to the metal sheet a film comprising a polyester, with the conditions under which the lamination is performed being such that during lamination the polyester film or films in the metal/polymer laminate is or are converted into non-crystalline (or amorphous) form.

Preferably each of the major surfaces of the metal sheet carries a film of non-crystalline polyester as defined above. However, the scope of the invention encompasses metal sheet carrying a non-crystalline polyester on one major surface with a layer of a different thermoplastic polymer film on the other major surface of the metal sheet.

The metal substrate to which the polymer films are applied, typically in the form of metal strip, is generally steel or aluminium or alloys thereof, typically a steel or aluminium based product used in the packaging industry.

The gauge range is typically 0.05 mm to 0.4 mm for steel and 0.02 mm to 0.4 mm for aluminium; generally 0.25 mm to 0.35 mm for steel and aluminium DWI cans.

The steel may be coated with tin, preferably passivated by conventional chromic treatments, or alternatively may be in the form of nickel or zinc plated steel, blackplate or phosphated blackplate, which is preferably chromate rinsed after phosphating.

The preferred steel finish is electrolytically chromium coated steel (ECCS) with a dual layer of chromium metal and chromium oxide. With such steels, the chromium metal and chromium oxide levels can vary widely. Typically, the chromium metal content ranges from 0.01 to 0.20 gm/m$^2$, while the chromium oxide ranges from 0.005 to 0.05 gm/m$^2$. The ECCS is commonly derived from deposition systems containing either sulphur containing or fluorine containing catalysts.

The aluminium which is used is preferably a 3004 type alloy with either an as-rolled ("mill") finish, a cleaned and optionally oiled finish, or an anodised oxide coating typically derived by anodising in phosphoric acid or a cleaned and chromate or chromate-phosphate treated, optionally oiled, finish. As an example, Alocrom A272 is a proprietary chromate-phosphate treatment system for aluminium strip.

A number of different types of polyester film can be used to prepare the metal polymer laminate. Typical polyester materials suitable for use in preparing the metal polymer laminate of the invention are:
  (i) cast thermoplastic polyester such as polyethylene terephthalate.
  (ii) biaxially oriented polyester films having a semi-crystalline structure, typically biaxially oriented polyethylene terephthalate.
  (iii) cast co-extruded composite polyester film.
  (iv) a composite co-extruded polyester film comprising:
    (A1) an inner layer of a substantially non-crystalline linear polyester having a softening point below 200° C. and a melting point below 250° C. but above 150° C., and
    (A2) an outer layer of a biaxially oriented linear polyester having a crystallinity greater than 30%.

When using a co-extruded polyester film, it is preferred to use a film having a thinner inner layer (A1) and a thicker outer layer (A2).

Typically, the outer layer (A2) is a PET homopolymer. Its intrinsic viscosity is preferably between 0.5 and 1.1, more preferably 0.6 to 0.7, for biaxially oriented film and greater than 0.9 for cast film.

The thinner inner layer (A1) is typically a substantially non-crystalline linear copolyester of 80% ethylene terephthalate and 20% ethylene isophthalate. Alternatively the inner layer is a substantially non-crystalline copolyester derived from terephthalic acid and two dihydric alcohols such as ethylene glycol and cyclohexane-dimethanol; or ethylene glycol and diethylene glycol.

If desired the polyester layers can be pigmented, for example with anti-blocking agents such as synthetic silica or pigments giving a coloured or white appearance, for example titanium dioxide. It is particularly Preferred to pigment layer A2 with titanium dioxide for the outside surface of a beverage can formed from the laminate.

Preferably the coextruded film's outer layer (A2) is polyethylene terephthalate. Preferably the inner amorphous layer (A1) is a linear copolyester, for example an amorphous copolymer of approximately 80% ethylene terephthlate and approximately 20% ethyleneisophthalate. Copolyesters of terephthalic acid and two alcohols, for example ethylene glycol and cyclohexanedimethanol, are also suitable for use as the inner amorphous layer (A1).

Where the coextruded film is biaxially oriented, the crystallinity of the outer crystalline layer (A2) is typically 50%, but can be reduced to 10% or less.

Biaxially oriented film may be formed by stretching the amorphous extruded polymer in the forward direction at temperatures above the glass transition temperature of the polymer by a factor of 2.2 to 3.8 and similarly in the transverse direction by 2.2 to 4.2.

In order that DWI cans produced from the laminate will withstand the can drying and print storing operations without melting or appearance change at temperatures typically 180° C. to 200° C., it is preferable that the outer layer of polyester have a melting point greater than 200° C.

The cost of the polyester is an important factor in the financial viability of the laminate as the stock for DWI beverage cans. PET is the least expensive polyester currently available and "closely related copolyesters" are also inexpensive compared to polyesters containing tetramethylene groups such as PBT. PET is derived from terephthalic acid and ethylene glycol monomers, typically either via terephthalic acid or dimethyl terephthalate reacting with ethylene glycol. "Closely related copolyesters" have a minor proportion of additional difunctional acids and or diols. To achieve the minimum melting point of about 200° C., it is necessary to limit the additional difunctional acid or diol content to not more than about 40 mole %. A general expression of the polyester is given by the following formula:

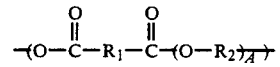

in which $R_1$ is a divalent hydrocarbon group at least 60 mole percent, preferably 75 mole percent, and most preferably 80 mole percent, of which is desirably derived from terephthalic acid and consists of p-phenylene groups.

$R_2$ is a divalent hydrocarbon group at least 60 mole percent, preferably 75 mole percent, and most preferably 80 mole percent, of which is desirably derived from dihydric alcohol comprising at least such percent of ethylene glycol and preferably consists of —$C_2H_4$— groups with A = 1, and A is an integer This polyester preferably has an intrinsic viscosity, as measured by gel permeation chromotography, in a range between 0.5 and 1.1, more preferably between 0.5 and 0.9, and a melting point between about 200° C. and about 270° C., and can be utilized in the drawn and wall-ironed can of the invention and the inventive processes for preparing laminated metal sheets.

The laminated metal sheet of the invention is prepared by a process which comprises adhering to one or both major surfaces of the metal sheet a film comprising a polyester, the lamination conditions being such that during lamination the polyester film or films in the metal/polymer laminate is or are converted into non-crystalline or amorphous form.

In one preferred process of preparing the metal polymer laminates in accordance with the invention non-crystalline polyester monolayer film or films are adhered directly to one or both major surfaces of the metal sheet. The film or films have the constituencies and properties described above and are adhered to the metal sheet by heating the metal sheet to a temperature (T1) above the melting point of the polyester films, the temperature (T1) being such that during lamination of the polyester films to the metal sheet, the outer surfaces of the polyester films remain below their melting points, laminating the film or films to the metal sheet, reheating by indirect means the laminate to a temperature (T2) above the melting points of the polyester films and after holding at these elevated temperatures, quenching rapidly the polyester coated metal to a temperature below the glass transition points of the polyester coating resins. The lamination conditions are such that during lamination the polyester monofilm or monofilms in the metal/polymer laminate is or are converted into non-crystalline or amorphous form.

In an alternative preferred process, the polyester film or films are composite films (A) of a non-crystalline co-polyester directly adhered to one or both major surfaces of the metal sheet. The film or films have the constituencies and properties described above and comprise an inner layer (A1) and an outer layer (A2), and the composite polyester films are simultaneously adhered to the metal sheet by a process which comprises (i) heating the metal sheet to a temperature (T1) above the softening point of the polyester inner layer (A1) but below the melting point of the outer layer (A2), (ii) laminating the film or films to the metal sheet, (iii) reheating by indirect means the laminate so that the metal sheet reaches a temperature above the melting point of the or each polyester film, and (iv) after holding above these elevated temperatures, quenching rapidly the polyester coated metal to a temperature below the glass transition points of the polyester coating resins.

The lamination conditions are such that during lamination the composite polyester film or films in the metal/polymer laminate is or are converted into non-crystalline or amorphous form. The said composite polyester films are preferably co-extruded polyester films comprising (A1) an inner layer of substantially non-crystalline linear polyester having a softening Point below 200° C. and a melting point below 250° C. but above 150° C., (A2) an outer layer of polyester having a melting point above 200° C., the polyesters having intrinsic viscosities of 0.5 to 1.1. The or each composite film of the polyester which is applied to the metal sheet can be co-extruded cast composite polyester film. Further, the or each composite film of the polyester which is applied to the metal sheet can be a composite co-extruded polyester film comprising prior to the conversion into non-crystalline or amorphous form:

(A1) an inner layer of substantially non-crystalline linear polyester having a softening point below 200° C. and a melting point below 250° C. but above 150° C., and (A2) an outer layer of a biaxially oriented linear polyester having a crystallinity greater than 30%.

The metal/polymer laminate is preferably re-heated downstream of the lamination nip by use of induction heating means, but infra-red heating may also be used.

The temperature to which the metal sheet should be heated prior to lamination depends both on the thickness of the films to be laminated and also on the chemical nature of the said films. The uncoated metal may be treated by direct or indirect means for example, induction, infra-red, hot air or hot rollers.

Temperatures (T1) of 140° C. to 330° C. are suitable for coextruded biaxially oriented Polyester film, 130° to 250° C. for cast coextruded polyester film, 260° C. to 330° C. for biaxially oriented polyester monofilm of high crystallinity or 200° C. to 300° C. for polyester film of low crystallinity.

The temperatures (T2) to be used on re-heating the laminate downstream of the lamination nip typically are above 240° C. for polyesters and up to about 330° C. Commercial operations generally demand a dwell time of approximately two seconds only between the re-heating operation and quenching. The quenching is uniform and rapid and can be accomplished by curtains of cold water directed at the strip.

The laminates of this invention are particularly suited for forming into drawn and wall ironed cans (DWI). Conventional DWI operations manufacture cans from metal sheet free from organic coatings by the following steps:

1—lubricate the tinplated or aluminium sheet

2—cut a disc of material from the metal sheet

3—place the disc on a circular die set and hold in place with a cylindrical blankholder ring 4—advance a punch through the die set whilst controlling the sheet movement with the blankholder 5—form a shallow cup from the metal by forcing the punch through the die until all the metal passes through the die and remove the punch.

6—transfer the cup to a punch of diameter equal to the diameter of the container desired.

7—redraw the cup and force the punch and cup through a set of concentric rings each with a progressively smaller internal diameter and such that the clearance between the punch and die is less than the thickness of the cup material.

8—the cup wall is ironed and elongated.

9—restrain the formed can and remove the punch.

10—trim excess material from the can wall top.

11—wash the can to remove lubricant and in the case of aluminium, etch away metal detritus.

12—rinse and dry the can.

Generally after washing, an aluminium beverage can undergoes the following operations;

13—Chemically treat the surface

14—Rinse and dry in a conveyor oven

15—Coat external

16—Cure basecoat

17—Apply printed decoration.

18—Cure the decoration typically at 180° C. to 200° C.

19—Apply an internal coating (by spraying).

20—Cure the internal coating.

21—Neck and flange the can, reducing the neck diameter to a value compatible with an end closure and creating a flange for double seaming.

Alternatively, if a selected external basecoat is applied, the conventional printing operation can be replaced by a dye sublimation printing process such as described in GB 2101530, 2145971, 2141382, 2010529, 2141972 and 2147264. After the basecoat is cured, a paper label impregnated with a sublimable dye is wrapped around the can and held firmly to itself with a small amount of adhesive at the paper overlap. The can is passed through an oven at a temperature above the sublimation point of the dye and the print is transferred without the use of solvent. The label can be stripped with air jets, leaving a printed can with excellent print quality. This is a solvent-free process, substantially free from atmospheric emissions.

Drawn and wall-ironed cans (DWI cans) made from the laminate materials of the invention can be decorated and printed with conventional solvent based inks after the DWI can is formed.

In one embodiment, DWI cans made from the laminate materials of the invention are prepared by a process which includes the step of subjecting a laminated metal sheet having a film of a noncrystalline polyester which is adhered directly to one or both major surfaces thereof to a drawing and wall-ironing process. The polyester film or films have the constituencies and properties described above. For example, they consist essentially of at least about 60 mole percent preferably 75 mole percent, and most preferably 80 mole percent, of polyethylene terephthalate and the remainder being less than about 40 mole percent preferably 25 mole percent, and most preferably 20 mole percent, of copolymerized ester units other than polyethylene terephthalate, especially isophthalate. The outer surface of the can is constituted by the non-crystalline polyester film.

Thermoset polyester coatings will readily accept sublimed dyes and a process for transferring dyes from paper labels to DWI cans is commercially established. We have found that thermoplastic polyester coatings on metal sheet will accept sublimed dyes. However a high quality decoration from a paper label is only achieved if there is retained orientation in the PET coating. If the coating is amorphous, either because it has been melted in the lamination process or was derived from an unoriented film, the paper label sticks to the coating during the sublimation stage and marrs the decoration.

The sublimation from paper label is carried out by establishing intimate contact between paper and coating and heating to temperatures above 160° C. and usually up to 220° C. Under these conditions non-oriented PET is above its glass transition (Tg), relatively soft and will tack to paper. If the outer part, at least, of the coating retains biaxial orientation, the paper does not stick to the polyester during dye sublimation. The outer, oriented material in contact with the paper has a modified thermal behaviour and its effective glass transition is not encountered during dye sublimation.

The problems outlined in dye transfer into amorphous coatings would make dye sublimation of amorphous polyester coated DWI cans seem unlikely. Surprisingly we have found that DWI cans formed from amorphous polyester coated laminates in accordance with the present invention can be successfully decorated by dye sublimation using standard labels and sublimation conditions.

The label application must preferably be modified slightly to avoid label contact with approximately the bottom 2 mm of the can wall, as denoted "d" in FIG. 7a of the accompanying drawings. If this procedure is followed the paper will not stick to or marr the coating. Generally speaking, an amorphous coating of polyester will stick to paper if it is in contact above its Tg. However, the can forming operation introduces orientation into the polyester coatings of the laminates of the present invention and thereby raises the effective Tg. The amount of induced orientation is relatively small even at the can wall top and very different for internal and external coatings, so it is surprising that the beneficial effect which prevents paper sticking is so pronounced.

The laminates described in this invention can surprisingly be manufactured into DWI cans whilst retaining excellent coating integrity and adhesion. Furthermore the coated containers can be decorated by conventional printing or by a dye sublimation process.

The laminates of the present invention can also be used to manufacture other packaging components, particularly non-retorted packaging components. Typical examples of such other components are:

Draw redraw cans for beverage products for example 54 mm diameter by 70 mm heiqht cans made from 0.21 mm ECCS, 350 N/mm$^2$.

Scored easy open beverage can ends for example 65 mm steel or aluminium ends.

Integral neck oblong ends for oblong containers.

Paint can end components such as ring, ends and caps.

Aerosol end components such as cones and domes.

The principal advantages of this invention are:

elimination of all solvent emissions is made practicable and environmental protection is improved.

large can washers can be replaced by small rinsers, saving the washer chemical costs.

energy consumption is reduced by cutting down the number of oven passes necessary to complete the can.

external base protection is improved.

the internal protection of complex base profiles is improved.

the size and cost of a factory installation and the operation labour costs can be reduced.

external print quality is excellent.

BRIEF DESCRIPTION OF THE DRAWINGS

The present invention will now be described in further detail, by way of example only, with reference to the following Examples, and with reference to the following drawings, in which.

EXAMPLES 1 to 13

Figure 1:
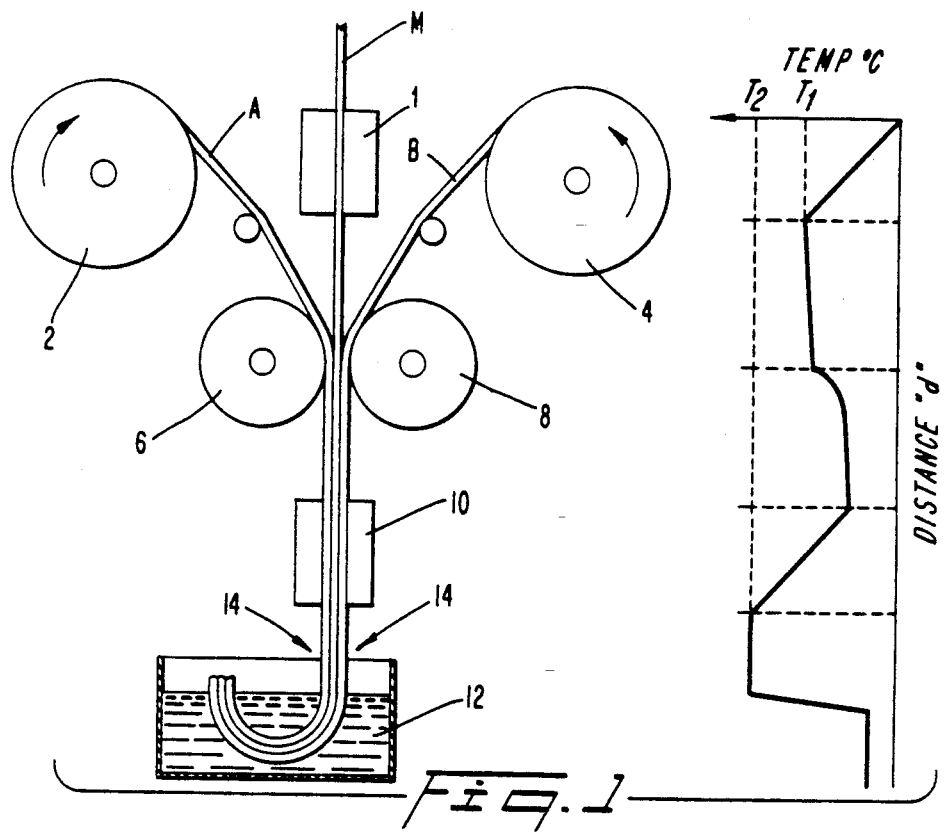
FIGS. 1 and 2 show diagrams of apparatus suitable for performing the process of the present invention.
Figure 2:
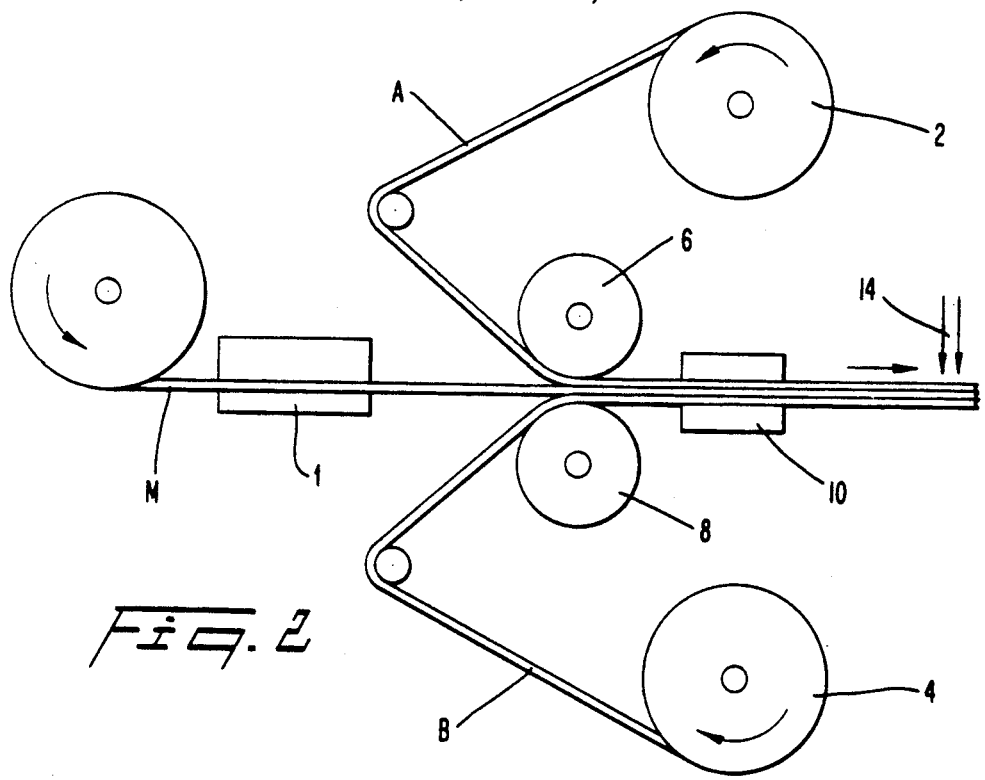
Figure 3:
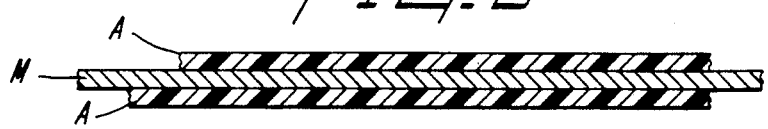
FIG. 3 shows a section taken through a laminate in accordance with the invention and comprising monolayered polymer films (A) laminated to a metal strip (M)
Figure 4:
FIG. 4 shows a section taken through a laminate similar to that of FIG. 3 but having a composite multilayered polymer film (A) laminated to a metal strip (M)
Figure 5:
FIG. 5 shows a section taken through a laminate similar to that of FIG. 4 but containing an additional film (B) of thermoplastic polymer laminated to the opposite side of the metal strip (M)
Figure 6:
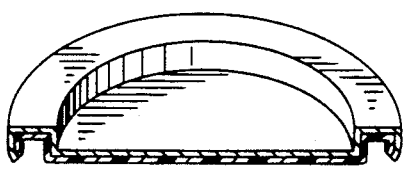
FIG. 6 shows a can end formed from a laminate in accordance with the invention.

Polymer/metal/polymer laminates were prepared by a lamination process performed in apparatus as illustrated schematically in FIG. 1 or FIG. 2 of the accompanying drawings. A metal sheet M was pre-heated by infra-red or induction heating to an appropriate temperature $T_1$ by a heater 1. Temperature $T_1$ is usually within the range 140° C. and 330° C. Polyester films A and B were fed from feed rolls 2 and 4 and laminated to the opposite sides of the pre-heated metal sheet between lamination rolls 6, 8, typically having a diameter of 100–400 mm. Lamination was generally performed using a nip force of 200–400 N per metre between the lamination rolls.

In the lamination nip, intimate and uniform, wrinkle-free contact between the metal sheet and the polymer films is established. Downstream of the lamination rolls the resultant laminate is re-heated, preferably by use of an induction heater 10 or by infra-red heating, to a laminate temperature $T_2$ at which the polymer films (A) will interact with and become strongly bound to the metal sheet. Temperature $T_2$ is usually within the range 240° to 330° C. for polyesters. The metal polymer laminate is held at temperature $T_2$ for a short period of time, usually no more than 2 seconds, and is then rapidly and uniformly quenched with water to a temperature below the glass transition point of the polyester in the films, for example about 80° C. for PET. Quenching can be performed in any conventional manner, but typically can be performed by passing the laminate through a tank 12 of water as shown in FIG. 1 or by passing the laminate through curtain 14 of quenching water as shown in FIG. 1 and FIG. 2.

In general, the process illustrated in FIG. 1 with the lamination being performed in a vertical mode is preferred. Vertical movement of the metal strip through the lamination stage tends to allow a higher quench rate and gives better and more uniform quenching.

FIG. 1 also shows a schematic diagram of a typical temperature profile which would be found in the process illustrated in the apparatus of FIG. 1.

Thus, laminates were prepared from the materials given in Table I by preheating the metal strip by infra-red or induction heating, passing the metal strip and polymer films into a pair of nip rolls and laminating both major metal surfaces simultaneously with the polymer films. The resultant laminate was reheated by infra-red or induction, held for two seconds and quenched rapidly and uniformly with cold water.

Table II sets out a number of Examples showing the results obtained when preparing such laminates using various metal temperatures (T1) in the pre-lamination stage and various reheating temperatures (T2) in the post-lamination stage.

Temperature $T_2$ is measured by pyrometer responding to radiation emitted at a wavelength of about 7.9 microns.

TABLE I

LAMINATE TYPES

| LAMINATE TYPE | Film to be laminated to one side of metal sheet (Thickness) | Metal Sheet (Thickness) | Film to be laminated to other side of sheet (Thickness) |
|---|---|---|---|
| A | PET composite - Type I (18 microns) | Al 3004 alloy (0.317 mm) | PET composite - Type I (18 microns) |
| B | PET monofilm (12 microns) | Al 3004 alloy (0.317 mm) | PET monofilm (12 microns) |
| C | PET composite - Type III (15 microns) | Al 3004 alloy (0.317 mm) | PET composite - Type III (15 microns) |
| D | PET composite - Type III (15 microns) | Al 3004 alloy (0.317 mm) | PET composite - Type I (18 microns) |
| E | PET composite - Type III (15 microns) | Al 3004 alloy (0.317 mm) | PET composite - Type II (25 microns) |
| F | PBT monofilm (25 microns) | Al 3004 alloy (0.317 mm) | PET composite - Type I (18 microns) |
| G | PET composite - Type III (15 microns) | Al 3004 alloy Mill Finish (0.317 mm) | PET composite - Type III (15 microns) |
| H | PP composite - Type I | Al 3004 alloy | PP composite - Type II |
| I | PET composite - Type III (15 microns) | Al 3004 alloy (0.317 mm) | PP composite - Type I (25 microns) |
| J | PET composite - Type III (15 microns) | ECCS 350 N/mm$^2$ (0.31 mm) | PET composite - Type III (15 microns) |
| K | Polyester - Type I (12.5 microns) | Al 3004 alloy (0.30 mm) | Polyester - Type I (12.5 microns) |
| L | Polyester - Type II | Al 3004 alloy | Polyester - Type II |

TABLE I-continued

LAMINATE TYPES

| LAMINATE TYPE | Film to be laminated to one side of metal sheet (Thickness) | Metal Sheet (Thickness) | Film to be laminated to other side of sheet (Thickness) |
| --- | --- | --- | --- |
| | (13 microns) | (0.30 mm) | (13 microns) |

KEY TO TABLE I
PET composite - Type I: Co-extruded cast PET composite film having:
(i) inner layer which is a copolyester of terephthalic acid with ethylene glycol and diethylene glycol, and
(ii) outer layer which is a PET homopolymer with an intrinsic viscosity greater than 0.9.
PET composite - Type II: As PET composite - Type I but additionally incorporating TiO2 pigment in outer layer.
PET composite - Type III: Co-extruded biaxially oriented PET composite film having:
(i) inner layer which is a copolyester of terephthalic acid and isophthalic acid with ethylene glycol, and
(ii) outer layer which is a PET homopolymer with an intrinsic viscosity of approx. 0.6 to 0.7.
PET monofilm: Monofilm of biaxially oriented PET having intrinsic viscosity of approx. 0.6 to 0.7.
PBT monofilm: Monofilm of cast polybutylene terephthalate (PBT).
PP composite - Type I: Cast co-extruded polypropylene composite film having:
(i) inner layer of maleic anhydride graft modified polypropylene, and
(ii) outer layer of polypropylene.
PP composite - Type II: As PP composite - Type I but additionally having outer layer pigmented with TiO2 and synthetic silica.
Al 3004 Alloy: Alluminium alloy 3004 having a chromate-phosphate surface treatment (Alocrom A272).
Al 3004 Alloy - Mill Finish: Aluminium alloy 3004 uncleaned and untreated after cold rolling.
Polyester - Type I: Biaxially oriented monofilm of polyester having a melting point of 235° C. and crystallinity >35%.
Polyester - Type II: Biaxially oriented monofilm of polyester having a melting point of 235° C. and crystallinity <10%.

The resin of polyester Type I and Type II contains 95 mole percent terephthalic acid and 91 mole percent ethylene glycol.

TABLE II

| EXAMPLE | LAMINATE MATERIALS | METAL TEMPERATURE ($T_1$) | REHEATING TEMPERATURE ($T_2$) | XRD ($\theta = 13°$) Ratio | Peak | Formability |
| --- | --- | --- | --- | --- | --- | --- |
| 1 | A | 180 | 280 | — | 0 | Excellent |
| 2 | A | 180 | 300 | — | 0 | Excellent |
| 3 | B | 300 | 280 | 0 | 0 | Excellent |
| 4 | B | 280 | 240 | 0.29 | 2000 | Poor |
| 5 | C | 220 | 280 | — | 0 | Excellent |
| 6 | C | 220 | 240 | 0.29 | 2000 | Poor |
| 7 | D | 200 | 280 | — | 0 | Excellent |
| 8 | E | 200 | 260 | — | 0 | Excellent |
| 9 | F | 200 | 260 | | | Excellent |
| 10 | G | 220 | 280 | — | 0 | Excellent |
| 11 | H | 160 | 270 | | | Poor |
| 12 | I | 150 | 270 | — | 0 | Poor |
| 13 | J | 220 | 280 | — | 0 | Good |
| 14 | J | 220 | 240 | 0.29 | 2000 | Poor |
| 15 | K | 270 | 260 | — | 0 | Excellent |
| 16 | L | 240 | 260 | — | 0 | Excellent |

The laminate formability was assessed by coating coverage after draw and wall ironing the laminate in two stages:
Stage 1: a cup (height 35 mm, diameter 86 mm) was drawn from the laminate, suitably lubricated.
Stage 2: a can body (diameter 65 mm, height 130 mm) was formed by redrawing and wall ironing.

After forming, the cans were rinsed in water and dried. Coating coverage was assessed by immersion in acidified copper sulphate for two minutes and visually inspecting for copper deposits or the "enamel rating" technique using a sodium chloride solution, a voltage of 6.3 V and measuring current in milliamps.

The influence of lamination temperatures on the polyester coating structure and formability of the laminate was assessed by x-ray diffraction. In this technique, the film or laminate is placed in an x-ray diffractometer. Count rates are measured when the flat samples are exposed to a beam of substantially monochromatic x-rays using an appropriate detector. The sample and detector are rotated in line with respect to the beam, maintaining the geometry such that the angle between the sample and beam ($\theta$) and beam and detector remain in the ratio 1:2, as in a normal Powder diffraction scan. This data generates information on planes parallel to the sample surface.

In biaxially oriented PET, the (1,0,0) plane gives a high count rate at $\theta = 13°$ C. but in amorphous PET the peak is absent. The ratio of $0 = 13°$ peak heights for laminate and film is related to the amount of retained orientation in the laminate. Our results are presented as the ratio of peak heights and the laminated PET coating peak height for $\theta = 13$. Laminate material B laminated in accordance with the teaching of GB 2123746 to retain orientation (see Example 4) had poor formability and failed to make cans without metal breaking or severe coating disruption. However, when laminate material B was processed to eliminate orientation and crystallinity, as in Example 3, it had excellent formability and afforded good protection after forming.

Similarly, biaxially oriented coextruded laminate materials C and J also gave good formability if amorphous, and poor formability if they retained orientation in the laminate (compare Example 5 with Example 6 and Example 13 with Example 14).

Cast, unoriented PET or PBT coatings were effective, provided they were laminated to produce an amorphous and not a crystalline condition. A crystalline condition is produced for example by slow cooling from the reheated stage.

PBT materials are considerably more expensive than polyesters closely related to PET (Examples 1 to 8 and 10 to 16).

Examples 11 and 12 show that laminates formed from polypropylene materials of the type described in GB 2003415 exhibited poor formability. Such laminates were found to give metal failure in can forming.

Examples 15 and 16 show the effectiveness of polyester coatings derived from biaxially oriented films of different film crystallinities.

The extent of re-orientation of the polyester coatings was assessed by examining a drawn and wall-ironed can made with the laminate and the conditions of Example 5. The following results were obtained:

| Sample Location | XRD ($\theta = 13°$) Peak |
| --- | --- |
| Can base - internal coating | <50 |
| Can base - external coating | <50 |
| Can wall top - internal coating | 100 |
| Can wall top - external coating | 450 |

The XRD data confirms that the laminated sheet had amorphous coatings and shows that the upper can wall is slightly oriented, more so for the can outside coating.

The lower 2 mm of the can wall external coating were not significantly affected by can forming and remained essentially amorphous.

Figure 7A:
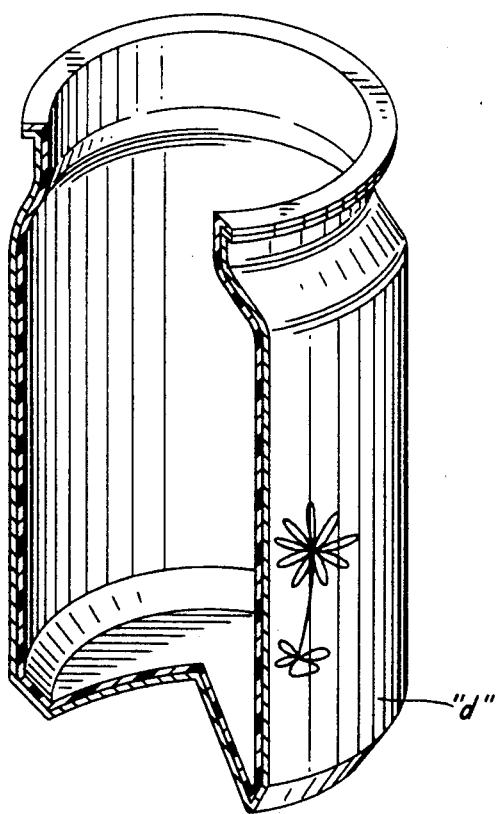
FIGS. 7a and 7b respectively show a drawn and wall-ironed can and a draw-redraw can formed from a laminate in accordance with the invention.
Figure 7B:
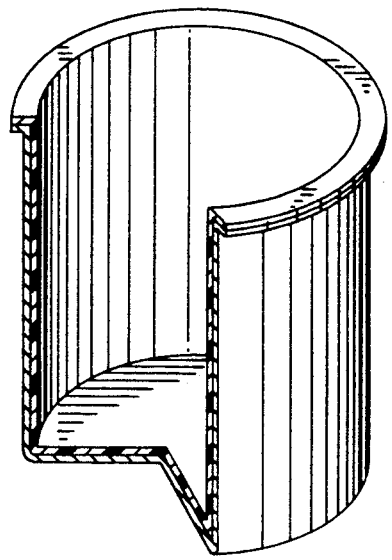

The external walls of DWI cans formed from the laminates of Examples 1 to 13, 15 and 16 were decorated by a conventional dye sublimation process. The quality of the resultant decoration was found to be excellent, provided the label was not in contact with the lower 2 mm of the can wall, region "d" of FIG. 7a.

What is claimed is:

1. A process for preparing a laminated metal sheet having on one or both major surfaces thereof a film of a non-crystalline polyester adhered directly thereto, said polyester being formed by polymerisation of a difunctional acid component comprising at least 60 mole percent terephthalic acid and a dihydric alcohol component comprising at least 60 mole percent ethylene glycol, which process comprises adhereing to one or both major surfaces of the metal sheet a monofilm of a polyester which is formed from a difunctional acid component comprising at least 60 mole percent terephthalic acid and a dihydric alcohol component comprising at least 60 mole percent ethylene glycol, said monofilm or monofilms being adhered to the metal sheet by heating the metal sheet to a temperature (T1) above the melting point of the polyester film, the temperature (T1) being such that during lamination of the polyester film or films to the metal sheet, the outer surfaces of the polyester film or films remain below their melting points, laminating the film or films to the metal sheet, reheating by indirect means the laminate to a temperature (T2) above the melting points of the polyester films; and after holding at these elevated temperatures, quenching rapidly the polyester coated metal to a temperature below the glass transition points of the polyester coating resins, the laminating reheating and quenching conditions being such that the polyester monofilm or monofilms in the metal/polymer laminate is or are converted into non-crystalline or amorphous form.

2. A process according to claim 1, wherein the temperature to which the laminate is re-heated after lamination is from 220°-330° C.

3. A process according to claim 1, wherein the indirect means for re-heating the laminate is an induction heating means.

4. A process according to claim 1, wherein the or each polyester film which is applied to the metal sheet is a cast thermoplastic polyester.

5. A process according to claim 4, wherein the cast thermoplastic polyester is polyethylene terephthalate.

6. A process according to claim 1, wherein the or each polyester film which is converted into non-crystalline or amorphous form is a biaxially oriented polyester having a semi-crystalline structure.

7. A process according to claim 6, wherein the biaxially oriented polyester is a biaxially oriented polyethylene terephthalate.

8. A process for preparing a laminated metal sheet having on one or both major surfaces thereof a composite film of a non-crystalline polyester adhered directly thereto, said polyester comprising a copolyester formed by polymerisation of a difunctional acid component comprising at least 60 mole percent terephthalic acid and a dihydric alcohol component comprising at least 60 mole percent ethylene glycol, which process comprises adhering to one or both major surfaces of the metal sheet a composite film or films of said copolyester having a polyester inner layer (A1) and a polyester outer layer (A2), said composite film or films of said copolyester being adhered to the metal sheet by a process which comprises
  (i) heating the metal sheet to a temperature (T1) above the softening point of the polyester inner layer (A1) but below the melting point of the polyester outer layer (A2),
  (ii) laminating the film or films to the metal sheet, and
  (iii) reheating by indirect means the laminate so that the metal sheet reaches a temperature above the melting point of the or each polyester film,
  (iv) after holding at these elevated temperatures, quenching rapidly the polyester coated metal to a temperature below the glass transition points of the polyester coating resins,
  (v) the laminating, reheating, and quenching conditions being such that the polyester film or films in the metal/polymer laminate is or are converted into non-crystalline or amorphous form.

9. A process according to claim 8, wherein the temperature to which the laminate is re-heated after lamination is from 220°-330° C.

10. A process according to claim 8, wherein the indirect means for re-heating the laminate is an induction heating means.

11. A process according to claim 8, wherein the or each composite film of said polyester which is applied to the metal sheet is a co-extruded cast composite polyester film.

12. A process according to claim 8, wherein the or each composite film of said polyester which is applied to the metal sheet is a composite co-extruded polyester film comprising prior to the conversion into non-crystalline or amorphous form:
  (A1) an inner layer of a substantially non-crystalline linear polyester having a softening point below 200° C. and a melting point below 250° C. but above 150° C., and
  (A2) an outer layer of a biaxially oriented linear polyester having a crystallinity greater than 30%.

13. A process according to claim 12, wherein the linear polyester of inner layer (A1) is an amorphous copolymer of ethylene terephthalate and ethylene isophthalate or a copolymer formed from terephthalic acid and two dihydric alcohols.

14. A process according to claim 12, wherein the outer layer (A2) is biaxially oriented polyethylene terephthalate.

15. A process according to claim 8 wherein said film has an outer layer of coextruded polyethylene terephthalate homopolymer.

16. A process according to claim 8, wherein said film has an outer layer of coextruded polyethylene terephthalate homopolymer with an intrinsic viscosity between 0.6 and 0.7 as measured by gel permeation chromotography.

17. A process according to claim 8, wherein a different coextruded composite film is adhered to each side of said metal sheet and the outer layer of at least one of those films is a polyethylene terephthalate homopolymer.

18. A process for preparing a laminated metal sheet having on one or both major surfaces thereof a film of a non-crystalline copolyester adhered directly thereto, said copolyester consisting essentially of a copolymer having at least about 60 mole percent of ethylene terephthalate and the remainder being less than about 40 mole percent of copolymerized ester units other than ethylene terephthalate, which process comprises adhering to one or both major surfaces of the metal sheet a monofilm or monofilms of said copolyester, said monofilm or monofilms being adhered to the metal sheet by heating the metal sheet to a temperature (T1) above the melting point of the polyester film, the temperature (T1) being such that during lamination of the polyester film or films to the metal sheet, the outer surfaces of the polyester film or films remain below their melting points; laminating the film or films to the metal sheet; reheating by indirect means the laminate to a temperature ($T_2$) above the melting points of the polyester films; and after holding at these elevated temperatures, quenching rapidly the polyester coated metal to a temperature below the glass transition points of the polyester film or films, the laminating, reheating and quenching conditions being such that the polyester monofilm or monofilms in the metal/polymer laminate is or are converted into non-crystalline or amorphous form.

19. The process according to claim 18, wherein said copolyester consists essentially of at least about 75 mole percent of ethylene terephthalate and the remainder being less than about 25 mole percent of copolymerized ester units other than ethylene terephthalate.

20. The process according to claim 19, wherein said copolyester consists essentially of at least about 80 mole percent of ethylene terephthalate and the remainder being less than about 20 mole percent of copolymerized isophthalate.

21. The process according to claim 18, wherein said copolyester is defined by:

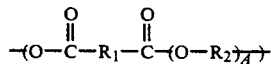

in which
$R_1$ is a divalent hydrocarbon group at least 60 mole percent of which consists of p-phenylene groups;
$R_2$ is a divalent hydrocarbon group at least 60 mole percent of which consists of —$C_2H_4$— groups with $A=1$ and wherein, for the remaining mole percent of $R_2$, A is an integer.

22. The process according to claim 21, wherein $R_1$ is at least 75 mole percent p-phenylene groups; and $R_2$ is at least 75 mole percent —$C_2H_4$— groups with $A=1$.

23. The process according to claim 22, wherein $R_2$ is at least 80 mole percent p-phenylene groups; and $R_2$ is at least 80 mole percent —$C_2H_4$— groups with $A=1$.

24. The process according to claim 21 wherein said remaining mole percent of $R_2$ is selected from the group consisting of diethylene glycol and cyclohexane dimethanol.

25. A process for preparing a laminated metal sheet having on one or both major surfaces thereof a film of a non-crystalline copolyester adhered directly thereto, said copolyester consisting essentially of a copolymer having at least about 60 mole percent of polyethylene terephthalate which process comprises adhering to one or both major surfaces of the metal sheet a monofilm or monofilms of said copolyester, said monofilm or monofilms being adhered to the metal sheet by heating the metal sheet to a temperature (T1) above the melting point of the polyester film, the temperature (T1) being such that during lamination of the polyester film or films to the metal sheet, the outer surfaces of the polyester film or films remain below their melting points; laminating the film or films to the metal sheet; reheating by indirect means the laminate to a temperature (T2) above the melting points of the polyester films; and after holding at these elevated temperatures, quenching rapidly the polyester coated metal to a temperature below the glass transition points of the polyester film or films, the laminating, reheating, quenching conditions being such that the polyester monofilm or monofilms in the metal/polymer laminate is or are converted into non-crystalline or amorphous form.

26. A process for preparing a laminated metal sheet having on one or both major surfaces thereof a film or a non-crystalline copolyester adhered directly thereto, said copolyester consisting essentially of a copolymer having at least about 60 mole percent of polyethylene terephthalate and the remainder being less than about 40 mole percent of modifying agents which process comprises adhereing to one or both major surfaces of the metal sheet a monofilm or monofilms of said copolyester, said monofilm or monofilms being adhered to the metal sheet by heating the metal sheet to a temperature (T1) above the melting point of the polyester film, the temperature (T1) being such that during lamination of the polyester film or films to the metal sheet, the outer surfaces of the polyester film or films remain below their melting points; laminating the film or films to the metal sheet; reheating by indirect means the laminate to a temperature (T2) above the melting points of the polyester films; and after holding at these elevated temperatures, quenching rapidly the polyester coated metal to a temperature below the glass transition points of the polyester film or films, the laminating, reheating, and quenching conditions being such that the polyester monofilm and monofilms in the metal/polymer laminate is or are converted into non-crystalline or amorphous form.

27. A process for preparing a laminated metal sheet having on one or both major surfaces thereof a composite film of a non-crystalline copolyester adhered directly thereto, said copolyester consisting essentially of a copolymer having at least about 60 mole percent of ethylene terephthalate and the remainder being less than about 40 mole percent of copolymerized ester units other than ethylene terephthalate, which process comprises adhering to one or both major surfaces of the metal sheet a composite film or films of said copolyester having a polyester inner layer (A1) and a polyester outer layer (A2), said composite film or films of said copolyester being adhered to the metal sheet by a process which comprises:
- (i) heating the metal sheet to a temperature (T1) above the softening point of the polyester inner layer (A1) but below the melting point of the polyester outer layer (A2);
- (ii) laminating the film or films to the metal sheet;
- (iii) reheating by indirect means the laminate so that the metal sheet reaches a temperature above the melting point of the or each polyester film; and
- (iv) after holding at these elevated temperatures, quenching rapidly the polyester coated metal to a temperature below the glass transition points of the polyester coating resins; wherein
- (v) the laminating, reheating and quenching conditions are such that the polyester film or films in the metal/polymer laminate is or are converted into non-crystalline or amorphous form.

28. The process of claim 27, wherein said polyester consists essentially of at least about 75 mole percent of ethylene terephthalate and the remainder being less than about 25 mole percent of copolymerized ester units other than ethylene terephthalate.

29. The process of claim 28, wherein said polyester consists essentially of at least about 80 mole percent of polyethylene terephthalate and less than about 20 mole percent of isophthalate.

30. The process of claim 27, wherein said polyester is defined by:

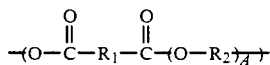

in which
$R_1$ is a divalent hydrocarbon group of at least 60 mole percent of which consists of p-phenylene groups; $R_2$ is a divalent hydrocarbon group at least 60 mole percent of which consists of —$C_2H_4$— groups with A=1, and wherein, for the remaining mole percent of $R_2$, A is an integer.

31. The process of claim 30, wherein $R_1$ is at least 80 mole percent p-phenylene groups; and $R_2$ is at least 80 mole percent —$C_2H_4$— groups with A=1.

32. The process of claim 30, wherein $R_1$ is at least 20 mole percent p-phenylene groups; and $R_2$ is at least 20 mole percent —$C_2H_4$— groups with A=1.

33. The process according to claim 30 wherein said remaining mole percent of $R_2$ is selected from the group consisting of diethylene glycol and cyclohexane dimethanol.

34. A process for preparing a laminated metal sheet having on one or both major surfaces thereof a composite film of a non-crystalline copolyester adhered directly thereto, said copolyester consisting essentially of a copolymer having at least about 60 mole percent of polyethylene terephthalate, which process comprises adhering to one or both major surfaces of the metal sheet a composite film of said copolyester having a polyester inner layer (A1) and a polyester outer layer (A2), said composite film or films of said copolyester being adhered to the metal sheet by a process which comprises:
- (i) heating the metal sheet to a temperature (T1) above the softening point of the polyester inner layer (A1) but below the melting point of the polyester outer layer (A2);
- (ii) laminating the film or films to the metal sheet;
- (iii) reheating by indirect means the laminate so that the metal sheet reaches a temperature above the melting point of the or each polyester film; and
- (iv) after holding at these elevated temperatures; quenching rapidly the polyester coated metal to a temperature below the glass transition points of the polyester coating resins; wherein
- (v) the laminating, reheating and quenching conditions are such that the polyester film or films in the metal/polymer laminate is or are converted into non-crystalline or amorphous form.

35. A process for preparing a laminated metal sheet having on one or both major surfaces thereof a composite film of a non-crystalline copolyester adhered directly thereto, said copolyester consisting essentially of a copolymer having at least about 60 mole percent of polyethylene terephthalate and the remainder being less than about 40 mole percent of modifying agents, which process comprises adhering to one or both major surfaces of the metal sheet a composite film of said polyester having a polyester inner layer (A1) and a polyester outer layer (A2), said composite film or films of said polyester being adhered to the metal sheet by a process which comprises:
- (i) heating the metal sheet to a temperature (T1) above the softening point of the polyester inner layer (A1) but below the melting point of the polyester outer layer (A2);
- (ii) laminating the film or films to the metal sheet;
- (iii) reheating by indirect means the laminate so that the metal sheet reaches a temperature above the melting point of the or each polyester film; and
- (iv) after holding at these elevated temperatures, quenching rapidly the polyester coated metal to a temperature below the glass transition points of the polyester coating resins; wherein
- (v) the laminating, reheating and quenching conditions are such that the polyester film or films in the metal/polymer laminate is or are converted into non-crystalline or amorphous form.

* * * * *